Figure 11:
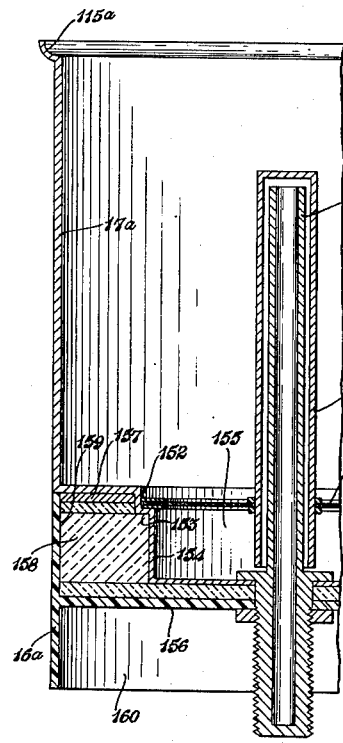

Nov. 20, 1951 A. C. WILCOX 2,575,777
COMBINATION AUTOMATIC AND PRESSURE DRIP COFFEE MAKER
Filed Dec. 13, 1947 4 Sheets-Sheet 1
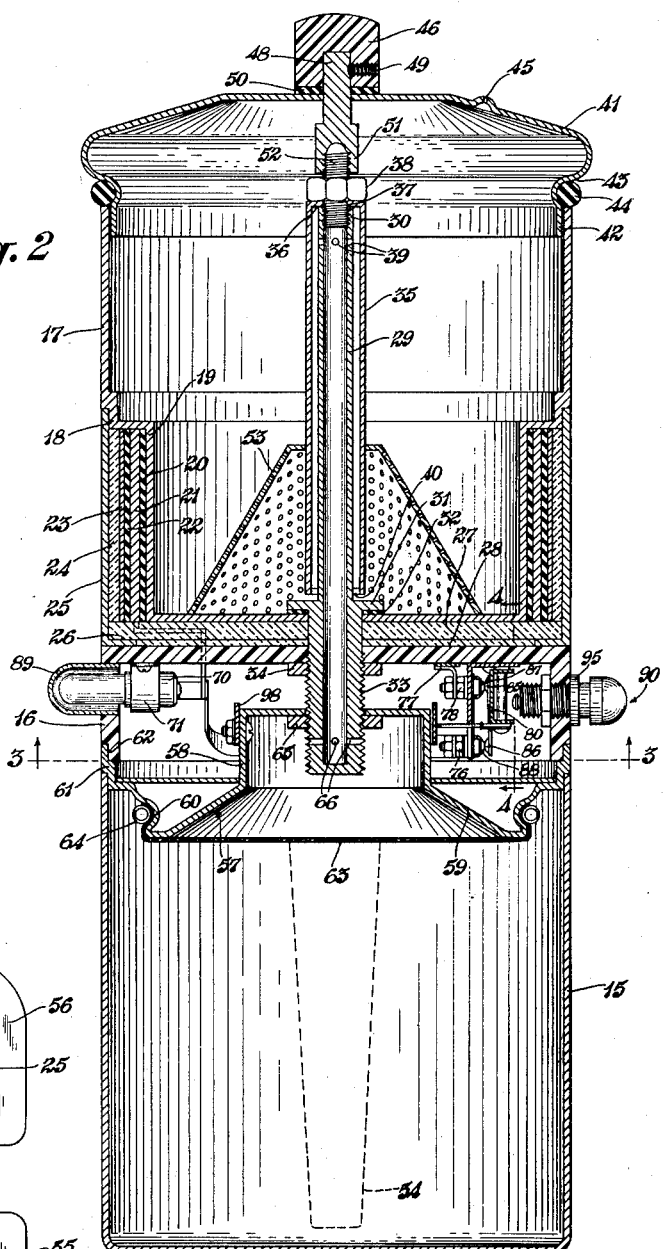
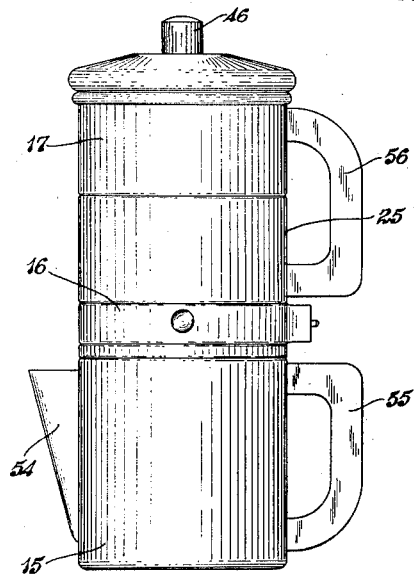
Inventor
Albert C. Wilcox
By Frease and Bishop
Attorneys

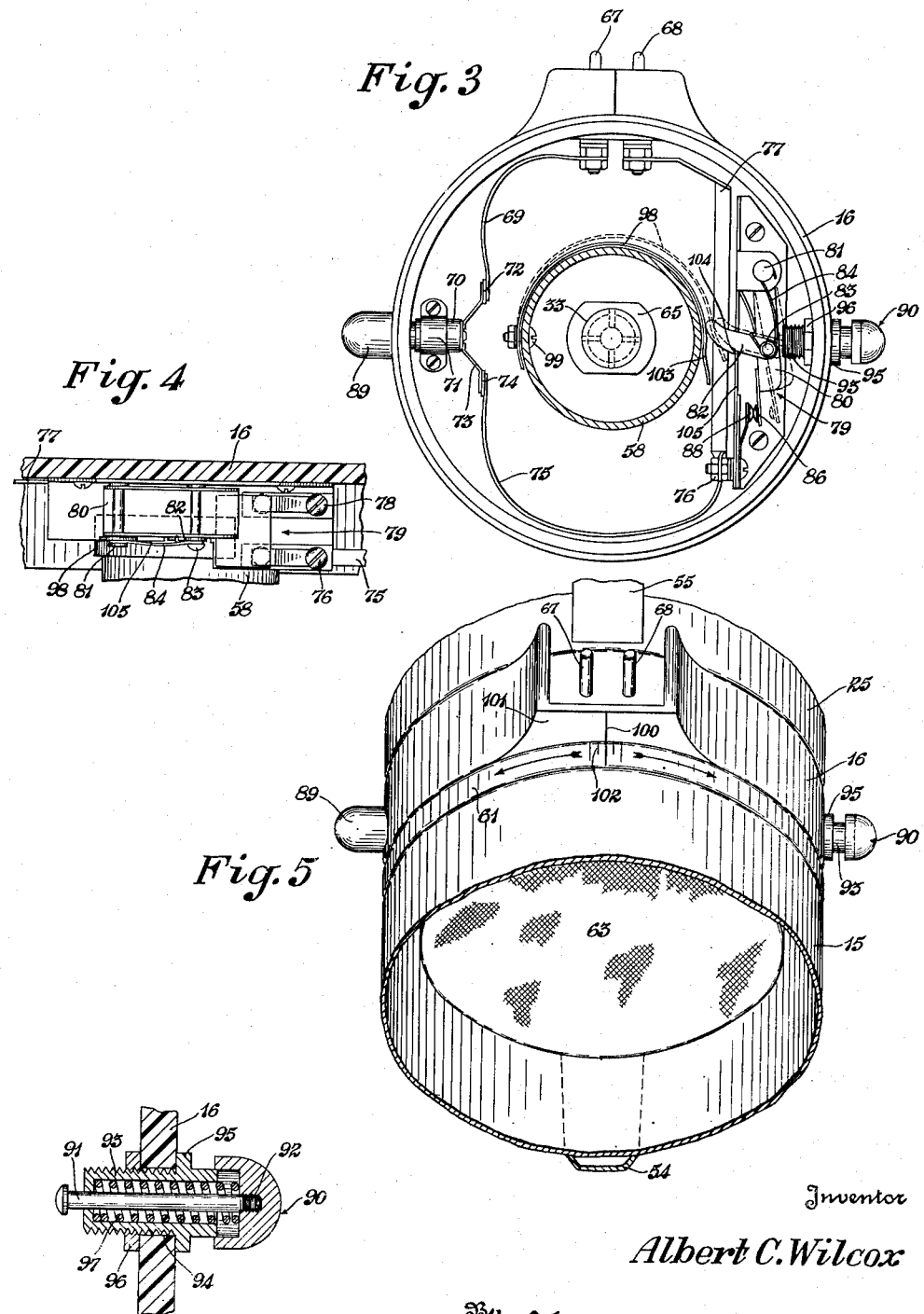

Nov. 20, 1951     A. C. WILCOX     2,575,777
COMBINATION AUTOMATIC AND PRESSURE DRIP COFFEE MAKER
Filed Dec. 13, 1947     4 Sheets-Sheet 3

Inventor
Albert C. Wilcox
By Fraser and Bishop
Attorneys

Nov. 20, 1951  A. C. WILCOX  2,575,777
COMBINATION AUTOMATIC AND PRESSURE DRIP COFFEE MAKER
Filed Dec. 13, 1947  4 Sheets-Sheet 4
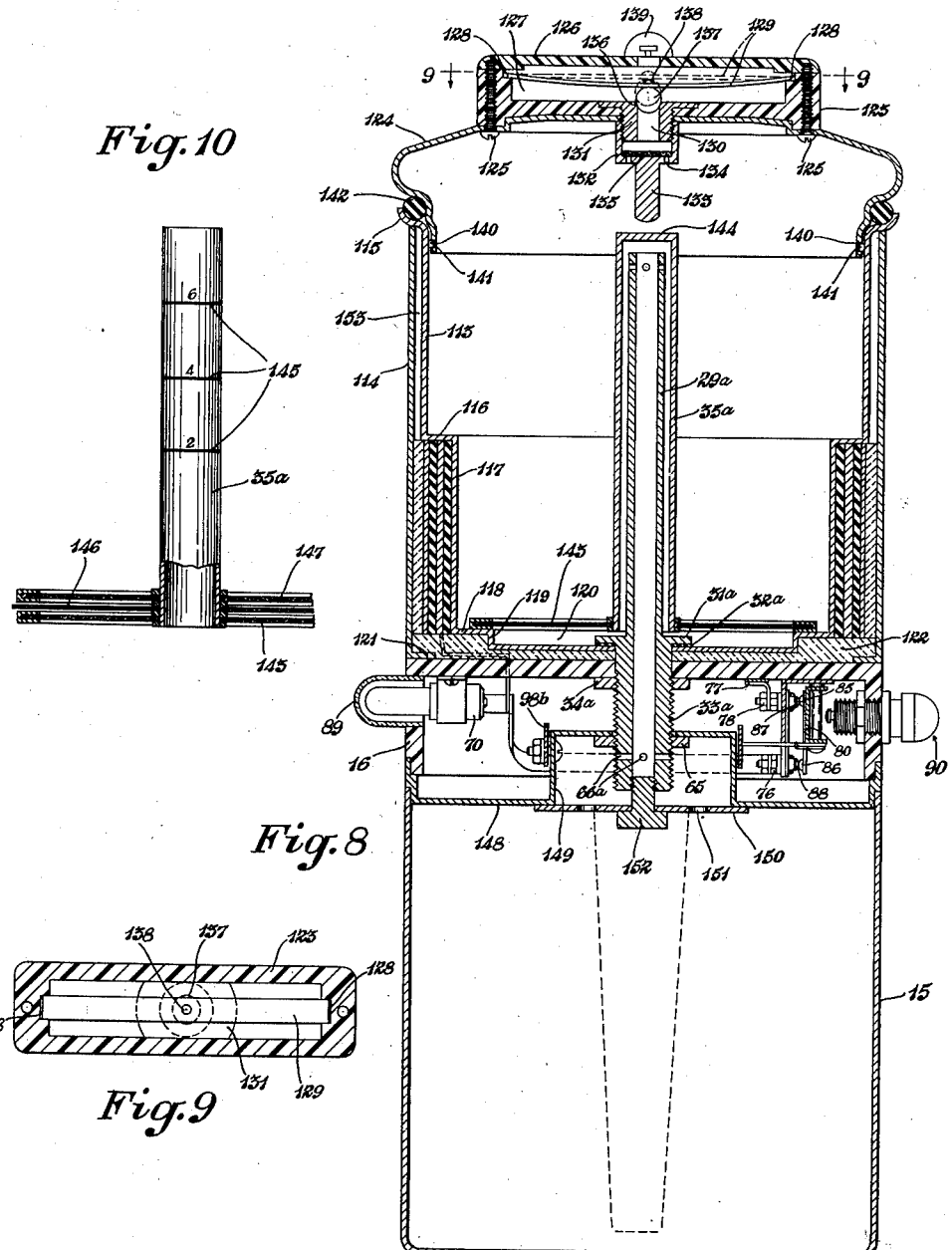
Inventor
Albert C. Wilcox
By Frease and Bishop
Attorneys Patented Nov. 20, 1951

2,575,777

UNITED STATES PATENT OFFICE 2,575,777

COMBINATION AUTOMATIC AND PRESSURE DRIP COFFEE MAKER

Albert C. Wilcox, Chicago, Ill.

Application December 13, 1947, Serial No. 791,601

6 Claims. (Cl. 99—281)

1

The invention relates to coffee makers of the type in which the coffee is brewed in an upper container and siphoned by pressure through a tube and into a lower receptacle.

An object of the invention is to provide a coffee maker of this character having a water and coffee container, a heating element in the wall of the same and a beverage receptacle below the heating element with a double siphon tube whereby the liquid is siphoned, under pressure of the steam created by the brewing of the coffee, from the upper container to the lower receptacle.

Another object is to provide such a device in which a conical screen is located around the lower portion of the siphon tube within the upper container.

A further object is to provide a coffee maker of this character in which the brewed coffee is sprayed from the lower end of the siphon tube onto a shell upon which is mounted a bi-metal strip for automatically operating a switch and breaking the circuit to the heating element.

A still further object is to provide a device of this character in which a momentary thumber button is provided for closing the switch to the heating element circuit to start the operation of the coffee maker.

Another object is to provide a coffee maker of this character in which a perforated coffee basket is located below the upper container in position to receive the heated liquid from the siphon tube.

A further object is to provide such a coffee maker in which a conical screen surrounds the lower portion of the double siphon tube within the upper container.

A still further object is to provide a coffee maker of the character referred to in which a well is formed in the bottom of the upper container and a sieve is located at the top of the well.

It is another object of the invention to provide a coffee maker having a heating element below the beverage receptacle for keeping the beverage hot after it has been brewed.

The above objects together with others which will be apparent from the drawings and following description or which may be later referred to, may be attained by constructing the improved pressure coffee maker in the manner hereinafter described in detail and illustrated in the accompanying drawings in which;

Figure 1 is a side elevation of a coffee maker embodying the invention;

Fig. 2 an enlarged vertical sectional view

Figure 7:
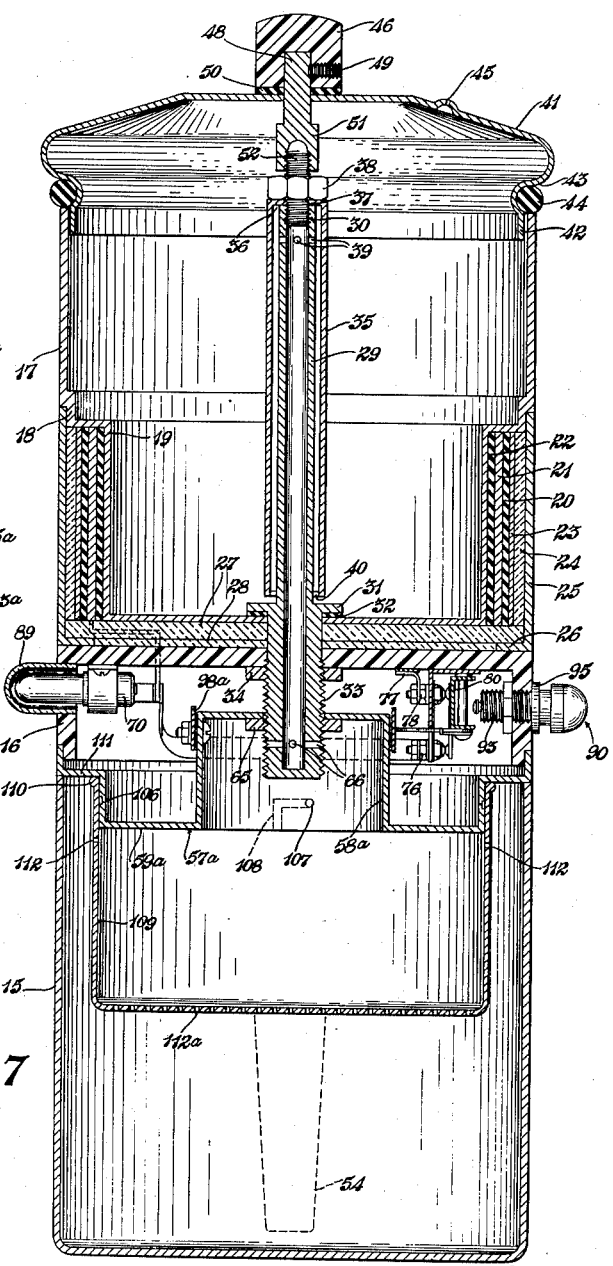

2 through one embodiment of the improved pressure coffee maker;

Fig. 3 a section on the line 3—3, Fig. 2, showing the circuit and switch for the heating element, and the momentary thumber button for manually closing the switch and the bi-metal strip for automatically opening the switch;

Fig. 4 a detail sectional view of the switch taken on the line 4—4, Fig. 2;

Fig. 5 a fragmentary perspective view of the Bakelite housing within which the switch and circuit are located, with adjacent portions of the upper container and lower receptacle;

Fig. 6 an enlarged longitudinal sectional view of the momentary thumber button;

Fig. 7 a vertical sectional view showing the improved pressure coffee maker converted into a drip coffee maker;

Fig. 8 a vertical sectional view of a modified form of the pressure coffee maker;

Fig. 9 a detail section on the line 9—9, Fig. 8;

Fig. 10 a sectional elevation of the outer tube showing a plurality of filters carried thereby;

Fig. 11 a fragmentary sectional elevation of a further modification; and

Fig. 12 a fragmentary section of the lower portion of the lower receptacle showing a heating element therefor.

The improved coffee maker comprises the lower receptacle 15, an insulated housing 16 located above the same and an upper container 17 mounted upon the insulated housing.

In this form of the invention the upper container 17 is shouldered and reduced midway of its height as indicated at 18, and then further shouldered and reduced just below this point as indicated at 19.

A band of insulation such as mica indicated at 20 surrounds the reduced lower portion 19 and an electric heating element in the form of a split ring 21 is located around this mica band and surrounded in turn by a second mica band 22.

A tightening belt 23 of steel or the like surrounds the heating unit with the mica insulation on each side clamping this assembly against the outside of the reduced portion 19 of the container.

An asbestos or other heat and cold insulation 24 surrounds the steel tightening belt and the entire heating unit assembly is enclosed by the outer shell 25 which may be of cylindrical shape, the upper end thereof fitting the shouldered portion 18 of the container, an annular inturned flange 26 being formed at the lower end of said outer shell spaced below the heating unit, discs 27 and 28 of asbestos or other suitable heat and cold insulation material being supported thereby and interposed between the bottom wall and the upper container 17 and the top of the Bakelite or other insulated housing 16.

The siphoning or bleeder tube comprises the inner tube 29 having its upper end internally threaded as at 30 and provided with a peripheral flange 31 at a point spaced from its lower end and spaced from the inner surface of the bottom wall of the container by the gasket 32, the lower end portion of this tube being preferably enlarged in diameter as shown and extended through suitable openings in the bottom wall of the container, the asbestos discs 27 and 28 and the top wall of the Bakelite housing 16, and is externally screw threaded as indicated at 33, a lock nut 34 being threaded thereon against the under surface of the top wall of the Bakelite housing to clamp the same tightly against the asbestos discs 27 and 28 and the bottom wall of the upper container.

The outer tube 35 has an inturned upper end 36, resting upon the top of the inner tube 29 and held clamped thereon by the lower threads 37 of the stud 38. Bleeder holes 39 are formed in the upper end portion of the inner tube 29 and the outer tube 35 terminates above the flange 31 of the inner tube forming bleeder ports 40.

The cover or lid 41 for the upper container 17 may be provided with the depending flange 42 adapted to be received within the upper, open end of the container and is provided with the annular groove 43 to receive the round rubber gasket 44.

A bleeder port 45 is formed in the lid 41 to regulate the timing of the coffee flow and to prevent premature siphoning. A knob 46 of Bakelite or other suitable material is connected to the top of the lid by means of the stud 48 and set screw 49, a sealing washer 50 being preferably located between the knob and the top of the lid.

The stud 48 has a nut portion 51 at its lower end for threading upon the upper threads 52 of the stud 38. A straining cone 53, perforated as shown, preferably surrounds the lower portion of the outer tube 35 and rests upon the bottom wall of the upper container.

The lower receptacle 16 may be provided with a spout 54 of any usual construction and with a handle 55 diametrically opposite thereto, and a similar handle 56 may be provided upon the upper container for manipulating the same.

A shell, as indicated generally at 57 in Fig. 2, is located below the parts just described and may comprise the inverted, cup-shaped portion 58, having a central aperture receiving the lower threaded end 33 of the inner tube, the flared lower conical portion 59 terminating in the upturned annular grooved portion 60 having the peripheral flange 61 fitting within the upper open end of the lower receptacle 15 and within the peripherally grooved lower end portion 62 of the Bakelite housing.

A filter cloth 63 is stretched across the bottom of the flared conical portion 59 of the shell, the ends of the filter cloth being clamped within the peripheral groove 60 of the shell as by the annular tension spring 64. A lock nut 65 is located upon the threaded lower portion 33 of the inner tube and against the top of the inverted cup shaped portion 58 of the shell clamping the same tightly upon the Bakelite housing 16. Outlet bleeder holes 66 are formed near the lower closed end of the inner tube 29.

The plug in terminals 67 and 68 are located through one side of the Bakelite housing 16. A conductor 69 leads from the terminal 67 to the electric light bulb 70, which is attached to the top wall of the Bakelite housing 16 as by the U-shape clamping strip 71, the conductor 69 being also connected to the terminal 72 of the heating unit 21.

A conductor 73 connects the light bulb 70 to the other terminal 74 of the heating unit which is connected by the conductor 75 with the lower switch terminal 76. A conductor 77 leads from the plug in terminal 68 to the upper switch terminal 78 of the single throw unit switch indicated generally at 79.

The switch has the arm 80 pivoted as at 81 and provided with a switch tripping lever 82 pivoted thereon as at 83 and provided with the spring 84. Upper and lower contact points 85 and 86 upon the switch arm 80 are adapted to engage the upper and lower fixed contacts 87 and 88 when the switch is closed, closing the circuit from the plug in terminals 67 and 68 to the heating unit and light bulb.

A light casing 89, which is preferably red in color and formed of glass or other suitable transparent or translucent material, encloses and protects the light bulb.

For the purpose of closing the switch, a momentary thumber button is provided indicated generally at 90, and shown in detail in Fig. 6. This button has a headed stem 91 attached thereto as by the screw threads 92, the stem being slidably located through the hollow, threaded stud 93, which is located through a suitable opening 94 in the Bakelite housing 16 and provided with a shoulder 95 engaging the outer side of the Bakelite housing, a nut 96 mounted upon the threaded stud engaging the inner side of the housing and clamping the stud in position therein.

A coil spring 97 is located around the headed stem 91 within the hollow stud 93 to normally hold the button 90 in the outward position. When the button 90 is pushed inward it moves the switch arm 80 from the dotted line position to the full line position as in Fig. 3, closing the switch.

An arcuate, bi-metal strip 98 is connected at one end to the outer side of the cup portion 58 of the shell as by the stud or rivet 99 and normally lays in contact with the periphery of the cup portion 58, as shown in full lines in Fig. 3.

When the switch is closed the end of the switch tripping lever 82 contacts the free end portion of the bi-metal strip. As the bi-metal strip is heated it will spring outward to the dotted line position shown in Fig. 3, tripping the switch lever 82 and opening the switch.

As best shown in Fig. 5 an indicating line 100 is provided upon the under side of the plug-in terminal projection 101 of the Bakelite housing 16 and a plurality of cooperating graduations 102 are formed upon the periphery of the flanged portion 61 of the filter shell.

The indicating line 100 and graduations 102 are for the purpose of adjusting the bi-metal. When this indicating line and the graduations are in the position shown in Fig. 5, the shoulder 103 of the bi-metal strip is in proper position relative to the tripping lever 82.

When the assembly of the coffee maker is completed, the fastening nut 65 is loosened and the filter shell 57 is turned in either direction bringing the shoulder 103 of the bi-metal strip either closer to or farther away from the tripping lever 82.

The method of fixing this adjustment is to press the momentary thumber button 90, which puts the switch in the on position and the tripping lever 82 is locked in place. Then turn the shell 57 slowly until the shoulder 103 of the bi-metal strip trips the lever 82. Then reverse the position of the shell 57 and move to the desired graduation and tighten the nut 65.

By this method close calibrations of the bi-metal can be set by graduations at almost the precise time wanted for switch tripping when hot water flows to the bi-metal chamber.

The timing of the operation may be controlled by the size of the bleeder port 45. If a small hole is provided the coffee will flow from the upper container shortly after the boiling point is reached, while if a larger hole is provided, the flow of coffee from the upper container will be prolonged after the boiling point. Any conventional means may be provided for adjusting this size of the bleeder port so that light or strong coffee can be made, or the bleeder port may be formed of pre-determined size at the factory.

In the operation of the coffee maker the lid 41 is removed from the upper container and the proper amount of ground coffee and water are placed in the upper container 17, the coffee surrounding the perforate cone 53, and the lid is replaced and clamped in place by means of the studs 48 and 52.

The momentary thumber button 90 is pressed, moving the switch to closed position, the shoulder 104 of the tripping lever 82 engaging over the edge of the switch housing 105 holding the switch in closed position. Current thus passes from the plug-in terminals 67 and 68 through the leads above described to the heating unit 21 and the light bulb 70.

The water heats and as it boils some steam escapes through the bleeder port 45 after which as the steam pressure increases, the brewed coffee beverage will be forced, by steam pressure in the upper container upon the top of the liquid, through the port 40, up through the outer tube 35, then through the bleeder holes 39 and down through the inner tube 29, and the hot coffee is sprayed under pressure through the holes 66 against the inner walls of the cup portion 58 of the filter shell.

The heat is radiated to the bi-metal strip 98 causing it to assume the dotted line position shown in Fig. 3, contacting the switch tripping lever 82 and disengaging the shoulder 104 thereof from the switch housing 105, permitting the spring 84 to draw the switch arm 80 to the open position shown in dotted lines in Fig. 3, breaking the circuit to the heating element and light bulb 70.

The insulated unit retains its heat for some considerable time after the switch is opened and the boiling action will continue until all of the brewed coffee is extracted from the upper container 17, the coffee being siphoned through the tubes 35 and 29 and passing down through the filter cloth 63 which catches the finer particles of coffee that the perforate cone 53 has failed to catch in the upper container, the bulb pulp of the coffee remaining in the bottom portion of the upper container around the cone 53.

In order to make a second brew of coffee immediately after the first, cold water is run into the shell 57 which immediately cools the bi-metal strip 98 so that it will move back to the full line position shown in Fig. 3. The second brew of coffee may then be made in the same manner as above described.

The asbestos discs 27 and 28 prevent heat radiation from the upper container 17 to the Bakelite housing 16, preventing any substantial amount of heat from radiating into the bi-metal chamber, making it compulsory that the device operate only when hot water is received from the upper container 17 into the shell 57 and prevents any operation of the bi-metal strip by radiated heat from the heating unit.

In Fig. 7 is shown the manner in which the improved automatic pressure coffee maker may be operated as an automatic drip coffee maker. For this purpose the straining cone 53 is removed from the upper container 17 and the shell 57 may be replaced by the shell 57a shown in Fig. 7.

This shell has the cup portion 58a, similar to the cup portion of the shell 57, which is attached to the lower threaded end 33 of the inner tube in the same manner as above described and has a bi-metal strip 98a of the same construction as the bi-metal strip 98.

The horizontal flange 59a is provided at the bottom of the cup portion 58a, having the upstanding peripheral flange 106 provided with studs 107 for engaging the bayonet slots 108 upon the perforate coffee basket 109, whereby the bead 110 of the coffee basket will fit closely against the shoulder 111 of the shell. The coffee basket has one or more bleeder ports 112 in its upper portion and its bottom wall is perforated as shown at 112a.

A filter paper may be placed in the bottom of the coffee basket and the proper amount of coffee placed therein and the coffee basket attached by the bayonet lock to the shell. The proper amount of water is then placed in the upper container 17 and the lid 41 fastened in place and the momentary thumber button 90 is pressed operating the switch to close the circuit in the manner above described for making coffee under pressure.

The boiling clear water is siphoned through the tubes 35 and 29 in the manner above described, the water spraying from the lower bleeder holes 66 of the inner tube against the walls of the cupped portion 58a of the shell and flowing through the coffee in the coffee basket and dripping into the lower receptacle 15. The automatic operation of the switch through the action of the bi-metal strip will be the same as above described.

In Fig. 8 is shown a modification of the pressure coffee maker. The lower receptacle 15 may be the same as shown in Figs. 2 and 7 and the upper container comprises an inner shell 113 and an outer shell 114. The inner shell has a half round bead 115 at its upper end and the lower portion is shouldered as at 116 and reduced as at 117 and again shouldered at 118 and reduced at 119 forming a well 120 in the bottom thereof.

The reduced portion 117 of the container is surrounded with an insulated heating unit, the same as shown in Figs. 2 and 7, and the same reference numerals are applied thereto, the heating unit being enclosed between the inner and outer shells of the upper container.

The upper end of the outer shell 114 engages the half round bead 115 of the inner shell and the lower end of the outer shell has the inturned flange 121 supporting the heat and cold insulation 122, such as asbestos, covering the bottom of the inner shell and insulating the same from the Bakelite housing 16 which may be of the same construction as shown in Figs. 2 and 7.

A knob 123, which may be oblong in shape, although it may be of other shapes, is connected to the top of the lid 124, as by the screws 125 which also secure the cover 126 upon the knob. This knob has a chamber 127 therein and is shouldered at each side as indicated at 128 to support opposite ends of a bi-metal strip 129, the ends thereof resting loosely upon the shoulders 128, a clearance being provided between the same and the cover 126 of the knob so that the bi-metal is perfectly free and flexible.

A central outlet passage 130 is formed through the lower portion of the knob 123, within the threaded thimble 131, and a lock bushing 132 is threaded thereon and provided with a depending projection 133 and with small openings 134 and preferably a fine sieve 135 to prevent grains of coffee from getting into the passage 130 and upon the ball valve seat 136 formed at the upper end thereof to seat the ball 137, which is shown attached to the central portion of the bi-metal strip 129 as at 138.

It should be understood that this is a showing of one specific embodiment and that if desired the bi-metal strip may be connected at one end to one side of the knob and the ball attached to the free end of the bi-metal strip. A steam whistle 139 is located upon the cover 126 of the knob.

The lid 124 is adapted to be tightly fastened upon the inner shell 113 by means of bayonet slots 140 and studs 141 to provide a tight fit between the upper container and the lid by means of the round rubber gasket 142.

The siphoning or bleeder tube includes the inner tube 29a, having its upper end open, and having a peripheral flange 31a spaced from its lower end, a gasket 32a being located between said flange and the bottom wall of the inner shell 113. The lower portion of this tube is preferably enlarged in diameter as shown and extended through suitable openings in the bottom wall of the container, the asbestos 122 and the top wall of the Bakelite housing 16, and is externally threaded as at 33a, a lock nut 34a being threaded thereon against the under surface of the top wall of the Bakelite housing to clamp the same tightly against the asbestos 122 and the bottom wall of the upper container.

A flat, very fine filter screen 143 is fixed to the lower end of the outer tube 34a and rests upon the shoulder 118 of the inner shell, covering the reservoir 120. The upper end of the tube 35 is closed, as indicated at 144, and spaced slightly above the end of the inner tube 29a.

Graduations may be placed upon the exterior of the tube 35a, as indicated at 145, to indicate the number of cups of water to be placed in the upper container. If desired a plurality of filter sieves may be rigidly connected to the lower end portion of the outer tube 34a, as shown in Fig. 10, comprising the lower filter sieve 143 as shown in Fig. 8, and for further refinement of coffee or elimination of sediment, a filter cloth 146 is placed over the same and a filter screen 147, with larger openings therein, is placed over the filter cloth compressing it on the fine sieve 143.

The switch mechanism and associated parts within the Bakelite housing 16 may be identically the same as shown in Figs. 2, 3 and 7 and the same reference numerals are applied thereto.

The shell 148, with cup portion 149 carrying the curved bi-metal strip 98b, is connected to the lower portion of the inner tube 29a as by the lock nut 34 and a baffle plate 150, with outlet openings 151, is located over the bottom of the inverted cup portion 149 and held in position as by the stud 152.

The extension 133 is provided so that if ground coffee is placed in the upper container before the tube 35a carrying the sieve 143, is placed in the upper container, the tube would set so high that the upper end of it would contact the extension 133, preventing closing of the lid by the bayonet lock. This insures no clogging by coffee of the coffee maker.

The desired amount of coffee is placed in the upper container, upon the filter sieve 143, and the proper amount of water is placed in the upper container. The lid 124 is placed in position and locked tightly by means of the bayonet locks, compressing the rubber gasket 142 within the bead 115. The momentary thumber button is pressed closing the circuit to the heating unit and the heat will travel up to the space 153 between the inner and outer shells of the upper container which will be helpful in heating the water.

The bi-metal strip 129, in the chamber within the knob 123, is straight at this time as indicated by dotted lines in Fig. 8 so that the ball 137 is raised from the seat 136. This bi-metal strip is of such thickness that it will not bend to close the port 130 until there is a considerable amount of live steam flowing.

Different timing for emptying of the upper container may be had by varying the thickness of the bi-metal strip 129. After the coffee boils the bi-metal strip 129 becomes active as steam is admitted to the chamber 128 and contacts the same and the bi-metal strip will bend down to the full line position shown in Fig. 8 so that the ball 137 seats upon the seat 136 closing the passage 130, the ends of the bi-metal strip flexing up to contact with the cover 126 of the knob so that pressure is exerted upon the ball 137 holding the ball tightly closed.

The trapped steam pressure in the upper container is now exerted upon the top of the boiling water and coffee in the upper container which flows through the retarding filter 143 into the unobstructed reservoir 120 and is forced up through the outer tube 35a and down through the inner tube 29a, being sprayed through the bleeder ports 66a upon the inside of the cup portion 149 of the shell 148 operating the bi-metal strip 98b and the switch in the manner above described in detail with reference to the form of the invention shown in Fig. 2.

If for any reason the steam pressure would be excessive the bi-metal strip 129 is of such thickness that when such pressure is exerted on the ball check valve 137 it acts as a pop valve for safety.

The steam escaping from the upper container during this operation causes the whistle to blow but as soon as the escaping steam becomes active on the bi-metal 129 the ball check valve thereon drops into the seat and closes off the escape of steam at which time the whistle stops blowing and the entire pressure is then exerted on the top of the coffee and water in the upper container and empties the same in a few seconds into the lower receptacle 15 so that the housewife will know that when the whistle stops blowing the coffee will be ready to serve in a very few seconds.

When coffee flows out of the tube 29a the baffle plate 150 retards the hot coffee and permits a flow of it through the openings 151 and such retarding action causes the bi-metal strip 98b to act quicker from the trapped steam and coffee above the baffle plate.

Where the plural filter sieve arrangement is used, as shown in Fig. 10, when pressure starts to force the coffee out of the upper container, the ground coffee bunches on top of the coarse sieve 147 to such an extent so that it acts as a filter. Then the coarse sieve catches the large grains of coffee and the filter cloth 146 catches the remainder of the fine sediments making a clear coffee beverage.

When coffee has been brewed and passed to the lower receptacle 15, the lid is removed from the upper container and the upper container and Bakelite housing are removed from the lower receptacle, the lid being placed on the lower receptacle which is used as a pot to serve the coffee.

The outer tube 35a may be grasped by the thumb and forefinger and lifted out of the upper container removing most, if not all, of the ground coffee and the upper container may be easily rinsed. The sieve acts as a scoop for lifting the grains of coffee out of the upper container.

In Fig. 11 is shown another modification, the upper container 17a having a half round bead 115a at its upper end. The lower portion of the container 17a is reduced as at 152 and shouldered as at 153 and further reduced as at 154 forming a reservoir 155 to be covered by the sieve 143a which is fixed upon the outer tube 35a.

The Bakelite housing 16a has a partition wall 156 intermediate its upper and lower ends and encloses the ring heating unit 157, which is substituted for the ring heating unit as above described in connection with the other forms of the invention. The sieve 143a is set far from the lower end of the tube 35a and rests upon the shoulder 153 of the upper container.

Using the ring heating unit requires additional heat insulation 158 in the upper cavity 159 of the Bakelite housing to prevent premature operation of the bi-metal strip in the switch cavity 160 thereof. The same switch mechanism and bi-metal strip as shown in any of the forms of the invention above described, may be located within the cavity 160 of the Bakelite housing and the other parts of the coffee maker may be of any other form above described.

With this construction the boiling action takes place above the sieve 143a and there is no boiling action within the reservoir 155. This prevents trapped water and steam under the sieve from percolating up the tube and causing premature emptying of the upper container before the proper time, that is the boiling action has to take place and the steam has to pass out through the knob at which time the bi-metal becomes active blocking off the bleeder port with the check valve in the knob. Tea may be brewed in any of these forms of coffee maker in the same manner as above described for the brewing of coffee.

As shown in Fig. 12, means may be provided upon the bottom of the lower receptacle 15, of any of the forms of the invention, to keep the brewed coffee beverage hot. This means is shown as a conventional electric heating unit indicated generally at 161, located upon the under side of the bottom wall 162 of the receptacle and connected thereto by any conventional means, as indicated at 163. Plug-in terminals 164 are connected to the heating unit and surrounded by the usual guard 165, and in order to hold the heating unit spaced above the table or other supporting surface upon which the coffee maker is placed, feet 166 are provided thereon.

I claim:

1. An automatic pressure coffee maker comprising an upper container, a cover therefor, a double bleeder tube comprising an inner tube extending from a point near the top of the container through the bottom thereof and having an opening at its upper end and a laterally disposed opening at its lower end and an outer tube spaced from the inner tube and closed at its upper end and terminating near the bottom of the container, an inverted cup-shape shell surrounding the lower portion of the inner tube, a curved bi-metal strip having one end connected to the shell and normally contacting the exterior of the shell throughout its entire length, a heating unit associated with the container, a circuit to the heating unit, a switch in the circuit located to be opened by the bi-metal strip and a lower receptacle.

2. An automatic pressure coffee maker comprising an upper container, a cover therefor, a double bleeder tube comprising an inner tube extending from a point near the top of the container through the bottom thereof and having an opening at its upper end and a laterally disposed opening at its lower end and an outer tube spaced from the inner tube and closed at its upper end and terminating near the bottom of the container, an inverted cup-shape shell surrounding the lower portion of the inner tube, a curved bi-metal strip having one end connected to the shell and normally contacting the exterior of the shell throughout its entire length, a heating unit associated with the container, a circuit to the heating unit, a light in the circuit, a switch in the circuit located to be opened by the bimetal strip and a lower receptacle.

3. An automatic pressure coffee maker comprising an upper container, a cover therefor, a double bleeder tube comprising an inner tube extending from a point near the top of the container through the bottom thereof and having an opening at its upper end and a laterally disposed opening at its lower end and an outer tube spaced from the inner tube and closed at its upper end and terminating near the bottom of the container, an inverted cup-shape shell surrounding the lower portion of the inner tube, a curved bi-metal strip having one end connected to the shell and normally contacting the exterior of the shell throughout its entire length, a heating unit associated with the container, a circuit to the heating unit, a switch in the circuit located to be opened by the bi-metal strip and a lower receptacle, and an insulation housing surrounding the circuit and switch and located between the upper container and the lower receptacle.

4. An automatic pressure coffee maker comprising an upper container, a cover therefor, a double bleeder tube comprising an inner tube extending from a point near the top of the container through the bottom thereof and having an opening at its upper end and a laterally disposed opening at its lower end and an outer tube spaced from the inner tube and closed at its upper end and terminating near the bottom of the container, an inverted cup-shape shell surrounding the lower portion of the inner tube, a curved bi-metal strip having one end connected to the shell and normally contacting the exterior of the shell throughout its entire length, a heating unit associated with the container, a circuit to the heating unit, a switch in the circuit located to be opened by the bi-metal strip, a momentary thumber button for manually closing the switch and a lower receptacle.

5. An automatic pressure coffee maker comprising an upper container, a cover therefor, a double bleeder tube comprising an inner tube extending from a point near the top of the container through the bottom thereof and having an opening at its upper end and a laterally disposed opening at its lower end and an outer tube spaced from the inner tube and closed at its upper end and terminating near the bottom of the container, an inverted cup-shape shell surrounding the lower portion of the inner tube, a baffle plate closing the bottom of the shell and having openings therein, a curved bi-metal strip having one end connected to the shell and normally contacting the exterior of the shell throughout its entire length, a heating unit associated with the container, a circuit to the heating unit, a switch in the circuit located to be opened by the bi-metal strip and a lower receptacle.

6. An automatic pressure coffee maker comprising an upper container, a cover therefor, a double bleeder tube comprising an inner tube extending from a point near the top of the container through the bottom thereof and having an opening at its upper end and a laterally disposed opening at its lower end and an outer tube spaced from the inner tube and closed at its upper end and terminating near the bottom of the container, an inverted cup-shape shell surrounding the lower portion of the inner tube, a curved bi-metal strip having one end connected to the shell and normally contacting the exterior of the shell throughout its entire length, a heating unit associated with the container, a circuit to the heating unit, a switch in the circuit located to be opened by the bi-metal strip and a lower receptacle, an insulation housing surrounding the circuit and switch and located between the upper container and the lower receptacle, and means upon the inner tube for clamping the upper container, the insulation housing and the shell together.

ALBERT C. WILCOX.

REFERENCES CITED

The following references are of record in the file of this patent:

UNITED STATES PATENTS

| Number | Name | Date |
|---|---|---|
| 627,885 | Viser | June 27, 1899 |
| 629,878 | Stanford | Aug. 1, 1899 |
| 762,794 | Ziegler | June 14, 1904 |
| 1,688,286 | Reichold | Oct. 16, 1928 |
| 1,954,551 | Wilcox | Apr. 10, 1934 |
| 1,962,165 | Wilcox | June 12, 1934 |
| 1,983,142 | Moriya | Dec. 4, 1934 |
| 1,990,508 | Wilcox | Feb. 12, 1935 |
| 2,017,701 | Millis | Oct. 15, 1935 |
| 2,175,727 | Graham | Oct. 10, 1939 |
| 2,180,655 | Abbate | Nov. 21, 1939 |
| 2,230,304 | Locke | Feb. 4, 1941 |
| 2,248,595 | Weeks | July 8, 1941 |
| 2,385,132 | Graham | Sept. 18, 1945 |

FOREIGN PATENTS

| Number | Country | Date |
|---|---|---|
| 594,221 | France | June 13, 1925 |
| 658,126 | Germany | Mar. 25, 1938 |